June 3, 1941.   A. T. SEBEK   2,244,123
LOCKING AND ALIGNING MEANS FOR MACHINES
Filed Aug. 31, 1938   2 Sheets-Sheet 1

Inventor:
Albert Sebek
By Frank J Schraeder Jr
Attorney.

June 3, 1941. A. T. SEBEK 2,244,123
LOCKING AND ALIGNING MEANS FOR MACHINES
Filed Aug. 31, 1938 2 Sheets-Sheet 2

Inventor:
Albert Sebek.
By: Frank J. Schraeder Jr.
Attorney.

Patented June 3, 1941

2,244,123

UNITED STATES PATENT OFFICE 2,244,123

LOCKING AND ALIGNING MEANS FOR MACHINES

Albert T. Sebek, Cicero, Ill.

Application August 31, 1938, Serial No. 227,869

2 Claims. (Cl. 22—92)

This invention relates to new and useful improvements in locking and aligning means for machines such as die-casting machines, die-stamping machines, presses and the like. The improvements are herein shown as applied to the die operating portion of a die-casting machine for purposes of illustrating one application of the important features of my invention.

One of the objects of my invention resides in providing novel means for maintaining and insuring the alignment between two relatively movable parts of a machine and especially between two elements of a machine wherein one element is moved relatively to another stationary element and into accurate or precise registry and alignment with such stationary element as, for example, in the die-casting machine herein illustrated, where a movable die holder is moved to register and align its die with a cooperating die supported on a stationary die holder.

Another feature of my invention is found in the provision of a mechanism including novel combined interconnected and coacting locking and aligning means.

With the above and other objects in view, my invention consists in the novel combination, construction and arrangement of the elements and cooperating parts shown in one embodiment in the attached drawings, described in the following specifications and particularly pointed out in the appended claims.

In the drawings:

Fig. 4 is a longitudinal section taken on line 4—4 of Fig. 2 showing the parts in closed position, and Fig. 5 is a vertical cross-section taken on line 5—5 of Fig. 2.

Figure 1:
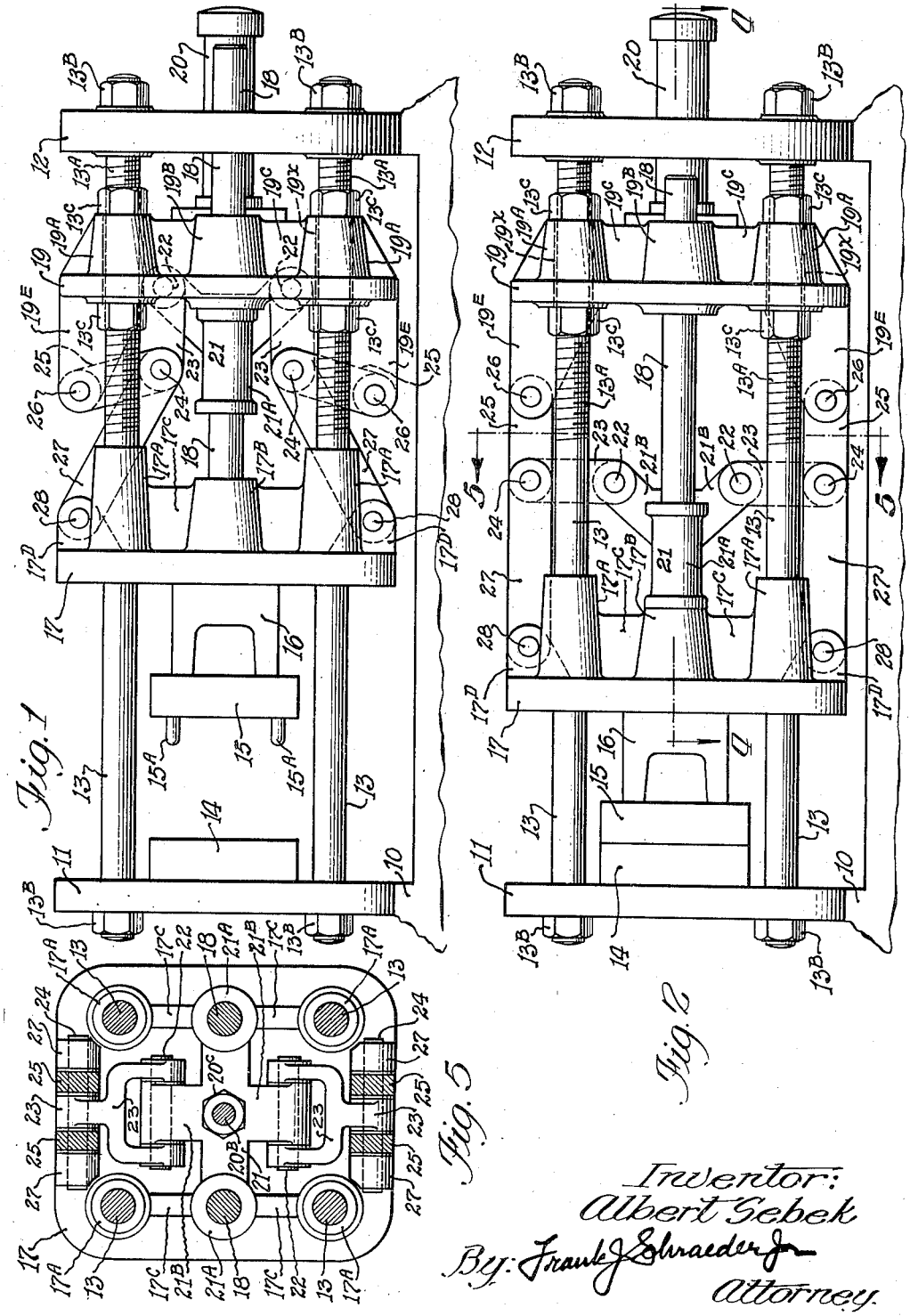
Fig. 1 is a side elevation of the die operating portion of a die-casting machine embodying my invention and showing the dies and mechanism in open position.

In the illustrations, 10 indicates a portion of the supporting base of a die-casting machine on which are mounted the front stationary frame 11 and the rear stationary frame 12. The frames 11 and 12 are connected together by the four longitudinally extending rods 13 which serve as supporting, guiding and adjusting means for movable elements hereinafter to be described and which rods are provided with threaded portions 13$^A$ and threaded ends for the tightening nuts 13$^B$. The ends of rods 13 are supported on frames 11 and 12 in suitable bearings and function as supports and guides for the moving parts.

The frame 11 may be termed the stationary die holder as it supports the stationary die portion 14 which cooperates with a movable complementary die portion 15 rigidly fixed to the supporting block 16 which is fixed to and carried by the movable die holder 17. The movable die portion 15 may be provided with registering or centering pins 15$^A$ for engagement in holes of the die portion 14 for facilitating proper registrations of the cooperating complementary die portions 14 and 15.

The movable die holder 17 is substantially a rectangular steel plate cast with four integral elongated bearings 17$^A$ for slidable mounting on the four supporting guide rods 13. The movable die holder 17 is also provided with a pair of spaced centrally disposed and laterally aligned integral extensions 17$^B$ which are designed to receive and support the ends of the two alignment rods 18 within shouldered recesses arranged to receive the shouldered ends of rods 18 and their tightening nuts 18$^A$ which securely hold the ends of the rods 18 within the elongated extensions 17$^B$, as more clearly shown in Fig. 4.

To strengthen and reenforce the extended bearings 17$^A$ and 17$^B$, I prefer to cast such bearings 17$^A$ and 17$^B$ with integral interconnecting ribs 17$^C$.

Near the rear end of the machine, I provide a normally stationary steel adjustment plate 19 which is slidably supported on the threaded portions of the four rods 13 which extend through suitable bushings 19$^X$ within the cast extensions 19$^A$. Being slidably mounted on the rods 13 the plate 19 may be adjusted relatively to the movable die-supporting plate 17 and the dies 14 and 15 and when the dies and plates 17 and 19 are so properly adjusted, the plate 19 may be fixed in such adjusted position against any lateral displacement on the rods 13 by tightening the four sets of nuts 13$^C$ against the plate 19.

In addition to its supporting extensions 19$^A$, the adjustment plate 19 is provided with a pair of centrally disposed and laterally aligned integral bearings 19$^B$ which are reenforced with the vertical ribs 19$^C$ cast integrally with and between the extensions 19$^A$ and bearing 19$^B$. The bearings 19$^B$ are adapted to slidably receive and support the free ends of the alignment rods 18.

The plate 19 is also designed to support the compressed air or steam operating centrally disposed piston cylinder 20, the front end of which is screw-mounted to the central portion 19D of the plate 19 and the unsupported rear end of such cylinder extends through a suitable opening 12A of the frame 12.

The piston 20A is provided with a forwardly extending piston rod 20B having its forward end secured to a yoke 21 by means of nuts 20C.

The yoke 21 is cast with a pair of laterally disposed bearings 21A for slidable mounting and support on the alignment rods 18.

The yoke 21 is also provided with a pair of centrally, vertically aligned and oppositely disposed ears 21B which are adapted to be connected by pins 22 to and between the forked ends of the toggle connecting links 23. The other ends of links 23 are pivotally connected by pins 24 to and between the forked ends of the upper and lower rear toggle links 25 the rear ends of which toggle links 25 are pivotally connected by pins 26 to and between the ears 19E cast integrally with the adjusting plate 19.

The rear forked ends of the upper and lower front toggle links 27 are pivotally connected to the pins 24 and embrace the outer sides of the forked ends of the rear toggle links 25.

The front ends of the upper and lower front toggle links 27 are pivotally connected by pins 28 to and between the ears 17D which are cast integrally with the movable frame 17.

The operation of the machine may be described by reference to Figs. 1 and 2 which respectively show the open and closed positions of the dies 14 and 15.

Assuming that the mechanism is in open position as shown in Fig. 1, compressed air or steam is passed into the cylinder 20 to move the piston 20A, its connecting rod 20B and yoke 21 forwardly. The forward sliding movement of the yoke 21 on the alignment rods 18 will cause upward movement of the links 23 thus pushing the movable die carrying plate 17 forwardly toward the stationary die supporting frame 11 by the pressure of the toggle links 27 until the two complementary die portions 14 and 15 are brought to closed position whereupon the die may be charged with a heated fluid casting composition by any well known means such as a charging ladle.

Any suitable charging device or charging ladle for the molten metal may be used. A suitable charging ladle and its operating mechanism is shown in Patent No. 1,729,801 issued to me on October 1, 1929. In this patent the ladle 14 is provided with a discharge nozzle 14B which is adapted to be brought into die-charging position in registration with the die opening 13.

Figure 2:
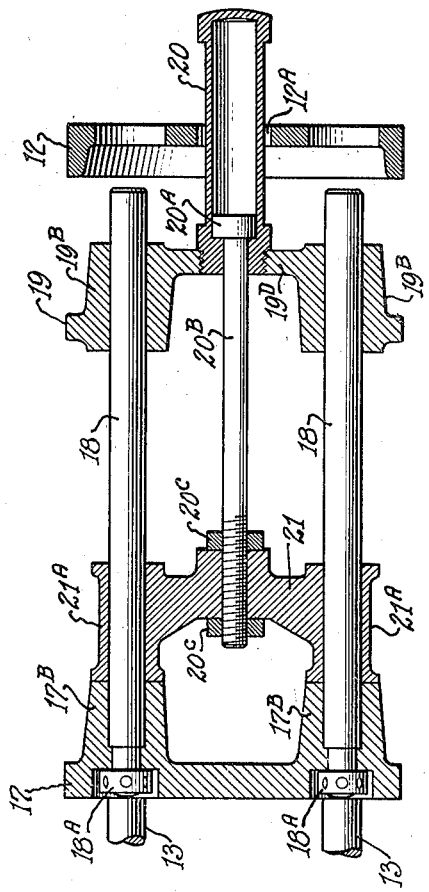
Fig. 2 is a side elevation similar to that shown in Fig. 1 but showing the dies and operating mechanism in closed position ready for the casting operation.
Figure 3:
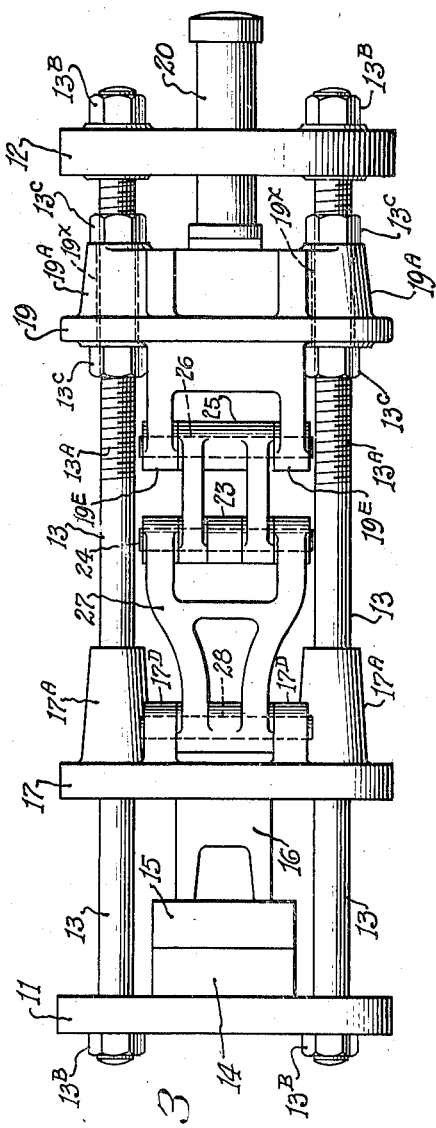
Fig. 3 is a plan view of the mechanism in closed position as shown in Fig. 2.

In the illustrations of the adaptation of my invention herein to a die-casting machine, a die-inlet opening, similar to the opening 13 shown in my Patent No. 1,729,801 is provided in the stationary die-supporting frame 11, and such opening is adapted to receive the molten metal for discharge into the complementary die portions 14 and 15 when same are in closed cooperating position as shown in Fig. 2.

When the die portions 14 and 15 are brought into proper closed position as shown in Fig. 2, the operating elements of the mechanism will assume their respective positions as shown in Fig. 2 wherein the upper and lower sets of toggle links 25 and 27 are longitudinally aligned into locked position and the front ends 21A of the yoke 21 are in abutment with the extensions 17B.

It will now be readily understood that the alignment rods 18 serve to perform two functions, namely, they constitute centrally located supports for the yoke 21 which simultaneously operates the upper and lower sets of die-locking toggles and the free extensions of the alignment rods 18 have sliding movement in bearings which are disposed centrally of and in alignment with the longitudinal axis of the dies and the die-operating mechanism and therefore these alignment rods 18 provide central supports for the movable die-carrying frame 17 and insure true precision alignment of the die portions 14 and 15 by preventing any relative angular displacement between the die portions 14 and 15 which might otherwise occur through wear in the bearings 17A.

It may be noted that yoke 21 will be bodily moved, during the closing movement of the movable die holder 17, a greater distance as compared to its movement on its supporting alignment rods 18 since these supporting rods are also simultaneously movable longitudinally of the machine with the movable die holder 17 during the movement of the yoke 21.

I claim:

1. In a die-casting machine having a stationary die portion and a movable die portion, a front stationary frame for supporting said stationary die portion, a rear stationary frame, spaced guide rods extending between said stationary frames and having elongated threaded portions, a holder for said movable die portion slidably mounted on said guide rods, a normally stationary member slidably adjustable on said guide rods positioned between said movable die holder and said rear frame, means for adjustably securing said member relatively to said stationary frames comprising threaded nuts on said elongated threaded rod portions, said member having a pair of tubular supports, a pair of aligning rods having corresponding ends secured to said movable die holder and the opposite ends slidably mounted in said tubular supports, and power-actuated means for moving said movable die holder and the die portion thereon into aligned cooperative engagement with said stationary die portion.

2. In a machine having a pair of relatively spaced fixed supports and a plurality of guides extending between said fixed supports, a die portion carried by one of said fixed supports, a normally stationary member supported on said guides between said fixed supports, said stationary member being adjustable relatively to said fixed supports, a reciprocable member slidably mounted on said guides between said normally stationary member and the one of said supports carrying said die portion, a die portion carried by said reciprocable member, a pair of alignment rods disposed parallel to and within the plane of the longitudinal axis of said reciprocable member having corresponding ends secured to said reciprocable member and their opposite ends slidably mounted in said normally stationary member, a set of toggles connecting said reciprocable member with said normally stationary member, and a power-actuated reciprocable yoke slidably mounted on said alignment rods and pivotally connected to said set of toggles.

ALBERT T. SEBEK.